US012316737B2

(12) United States Patent
Hsu et al.

(10) Patent No.: US 12,316,737 B2
(45) Date of Patent: May 27, 2025

(54) METHOD FOR VERIFYING MODEL UPDATE

(71) Applicants: Inventec (Pudong) Technology Corporation, Shanghai (CN); INVENTEC CORPORATION, Taipei (TW)

(72) Inventors: Chih-Fan Hsu, Taipei (TW); Wei-Chao Chen, Taipei (TW); Jing-Lun Huang, Taipei (TW); Ming-Ching Chang, Taipei (TW); Feng-Hao Liu, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 345 days.

(21) Appl. No.: 18/084,773

(22) Filed: Dec. 20, 2022

(65) Prior Publication Data

US 2024/0080180 A1 Mar. 7, 2024

(30) Foreign Application Priority Data

Aug. 30, 2022 (CN) .......................... 202211049547.1

(51) Int. Cl.
| | |
|---|---|
| *H04L 9/00* | (2022.01) |
| *G06N 20/00* | (2019.01) |
| *H04L 9/14* | (2006.01) |
| *H04L 9/32* | (2006.01) |

(52) U.S. Cl.
CPC ............ *H04L 9/008* (2013.01); *G06N 20/00* (2019.01); *H04L 9/14* (2013.01); *H04L 9/3242* (2013.01)

(58) Field of Classification Search
CPC ... H04L 9/008; H04L 9/14; H04L 9/30; H04L 9/00; H04L 9/3242; H04L 9/3236; G06N 20/00
USPC .......................................................... 713/189
See application file for complete search history.

(56) References Cited

U.S. PATENT DOCUMENTS

| | | | | |
|---|---|---|---|---|
| 11,227,187 | B1* | 1/2022 | Weinberger | G10L 15/19 |
| 11,580,535 | B2* | 2/2023 | Snow | H04L 9/3236 |
| 2009/0279699 | A1* | 11/2009 | Noda | H04L 63/06 |
| | | | | 380/259 |
| 2018/0316502 | A1* | 11/2018 | Nadeau | G06N 20/00 |

\* cited by examiner

*Primary Examiner* — Kaylee J Huang
(74) *Attorney, Agent, or Firm* — Troutman Pepper Locke LLP; Tim Tingkang Xia, Esq.

(57) ABSTRACT

The federated learning system includes a moderator and client devices. Each client device performs a method for verifying model update as follows: receiving a hash function and a general model; training a client model according to the general model and raw data; calculating a difference as an update parameter between the general model and the client model, sending the update parameter to the moderator; inputting the update parameter to the hash function to generate a hash value; sending the hash value to other client devices, and receiving other hash values; summing all the hash values to generate a trust value; receiving an aggregation parameter calculated according to the update parameters; inputting the aggregation parameter to the hash function to generate a to-be-verified value; and updating the client model according to the aggregation parameter when the to-be-verified value equals the trust value.

10 Claims, 11 Drawing Sheets

METHOD FOR VERIFYING MODEL UPDATE

CROSS-REFERENCE TO RELATED APPLICATIONS

This non-provisional application claims priority under 35 U.S.C. § 119(a) on Patent Application No(s). 202211049547.1 filed in China on Aug. 30, 2022, the entire contents of which are hereby incorporated by reference.

BACKGROUND

1. Technical Field

The present disclosure relates to a federated learning system, and more particularly to a method for verifying model update.

2. Related Art

When data becomes the core to guarantee the performance of machine learning models to solve practical problems, allowing multiple parties with different data to jointly train a model becomes more attractive to communities. Federated Learning (FL) has shown growing success in decentralized multi-modal feature learning. However, for the distributed nature of FL, security and privacy risks threatens the whole FL framework. Another issue arises when the moderator needs to evaluate and release the model to the consumers. As private client data are not accessible by the moderator, the representative data would be lost when clients cease to collaborate, resulting in largely biased FL gradient update and long-term training degradation. The naive approach of memorizing gradients during training is not a suitable solution, as gradients become unrepresentative very quickly as iteration progresses.

The moderator aggregates gradient updates from client devices. Most existing FL algorithms implicitly assume that the moderator is trustworthy and honest and focus on the single moderator setting. However, requiring clients to completely trust the moderator implies significant vulnerabilities on the clients' side. Besides, the assumption is strong when considering data privacy from individual and business entities. It has been less studied how to protect the moderator against corruption or failure. In the former case, the moderator might not follow the prescribed aggregation procedure and thus result in a wrong model; in the latter case, the moderator might be disconnected/dropped out due to unstable networks or the running server. Moderator failure (even honest dropout) can abruptly stop the training process and then eventually damages the collaborative training.

On the other hand, general cryptographic solutions and mechanisms such as multi-party computation and verifiable computation exist but they require heavy computation/communication overhead.

SUMMARY

Accordingly, the present disclosure proposes a method for verifying model update to improve the trustworthiness and robustness of the moderator in the federated learning system. The method for verifying model update proposed in the present disclosure includes multiple embodiments, where some embodiments have lightweight cryptographic protocols.

According to an embodiment of the present disclosure, a method for verifying model update applicable to a federated learning system having a moderator and a plurality of client devices, wherein the method includes a plurality of steps performed by each of the plurality of client devices and the plurality of steps includes: receiving a hash function and a general model from the moderator; training a client model according to the general model and raw data; calculating a difference between the general model and the client model as an update parameter; sending the update parameter to the moderator; inputting the update parameter to the hash function to generate a hash value; sending the hash value to the plurality of client devices other than itself and receiving a plurality of other hash values; summing the hash value and the plurality of other hash values to generate a trust value; receiving an aggregation parameter from the moderator, wherein the aggregation parameter is calculated by the moderator according to the update parameter from each of the plurality of client devices; inputting the aggregation parameter to the hash function to generate a to-be-verified value; comparing the to-be-verified value and the trust value, and updating the client model according to the aggregation parameter when the to-be-verified value equals the trust value.

According to an embodiment of the present disclosure, a method for verifying model update applicable to a federated learning system having a plurality of moderators and a plurality of client devices, wherein the method includes a plurality of steps performed by each of the plurality of client devices and the plurality of steps includes: receiving a general model from the federated learning system; training a client model according to the general model and raw data; calculating a difference between the general model and the client model; generating an update parameter by encrypting the difference with a public key; sending the update parameter to the plurality of the moderators; receiving a plurality of aggregation parameters from the plurality of moderators, wherein each of the plurality of aggregation parameters is calculated by each of the plurality of moderators according to the update parameter; searching a mode in the plurality of aggregation parameters; generating a decrypted result according to the mode and a private key when a number of modes exceeds half of a number of aggregation parameters; and updating the client model according to the decrypted result.

According to an embodiment of the present disclosure, a method for verifying model update applicable to a federated learning system having a plurality of moderators and a plurality of client devices, wherein the method includes a plurality of steps performed by each of the plurality of client devices and the plurality of steps includes: receiving a hash function and a general model from the moderator; training a client model according to the general model and raw data; calculating a difference between the general model and the client model; generating an update parameter by encrypting the difference with a public key; sending the update parameter to the plurality of the moderators; inputting the update parameter to the hash function to generate a hash value; sending the hash value to the plurality of client devices other than itself and, receiving a plurality of other hash values; summing the hash value and the plurality of other hash values to generate a trust value; receiving a plurality of aggregation parameters from the plurality of moderators, wherein each of the plurality of aggregation parameters is calculated by each of the plurality of moderators according to the update parameter; inputting each of the plurality of aggregation parameters to the hash function to generate a plurality of to-be-verified values; comparing each of the plurality of to-be-verified values and the trust value sequentially; and when one of the plurality of to-be-verified values equal to the trust value is found, decrypting the aggregation parameter corresponding to the to-be-verified value equal to the trust value according to a private key and updating the client model according to the decrypted aggregation parameter.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 1A to 5A are schematic diagrams of the architecture of a federation system to which the first to fifth embodiments of the present disclosure are applied, respectively;

FIG. 1B to 5B are flowcharts of the method for verifying model update according to the first to fifth embodiments of the present disclosure, respectively.

DETAILED DESCRIPTION

Figure 1A:
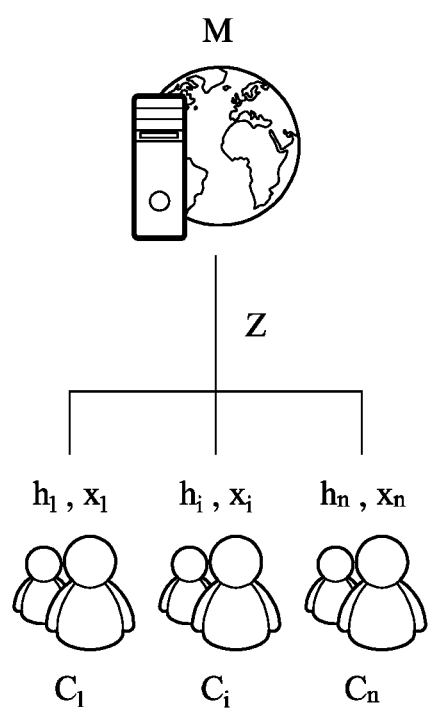

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The detailed description of the embodiments of the present disclosure includes a plurality of technical terms, and the following are the definitions of these technical terms:

Client, the endpoint that contributes the data to join a distributed training or federated learning, also called "client device".

Moderator, the service provider that collects the models from the clients to aggregate a general model for providing the service.

Raw data, the data that are held by a client and need to be protected, also called "private data".

Federated learning (FL), a collaborative training framework to train a machine learning model without sharing client data to protect the data privacy.

Machine learning, a field of study that gives computers the ability to learn without being explicitly programmed.

Homomorphic Encryption (HE), HE is a form of encryption that permits users to perform computations on its encrypted data without first decrypting it.

Towards trustworthy FL, several critical security requirements must be satisfied—reliability and robustness for moderators and privacy for clients—with the following goals:
(1) reliable aggregated result: how to verify the correctness of the aggregated result at the client device, which is related to the concept of verifiable computing;
(2) client privacy: how to protect each client's update parameters, which is related to data encryption; and
(3) robust moderators: how to proceed the computation when a moderator drops out or fails during training, which is related to the concept of Multi-Party Computation (MPC).

The method for verifying model update includes multiple embodiments, and these embodiments are applicable to FL systems with different configurations respectively. The corresponding relationship between the embodiment and the system configuration is shown in Table 1. FL systems can be divided into single-moderator and multiple-moderator according to the number of moderators. FL systems can be divided into non-private aggregation (update parameters are not encrypted) and private aggregation (update parameters are encrypted) depending on whether update parameters received by the moderator from client devices are encrypted. The configuration of the FL system is a combination of the above two classifications.

Table 1, embodiments of the method for verifying model update and configurations of FL systems suitable thereof.

|  | Non-private Aggregation | Private Aggregation |
| --- | --- | --- |
| Single moderator | $1^{st}$ Embodiment: SVM | $2^{nd}$ Embodiment: SSVM |
| Multiple moderators | $1^{st}$ Embodiment: SVM extended | $3^{rd}$ Embodiment: MSVM-$\frac{2}{3}$ |
|  |  | $4^{th}$ Embodiment: MSVM-half |
|  |  | $5^{th}$ Embodiment: MSVM-one |

Figure 1B:
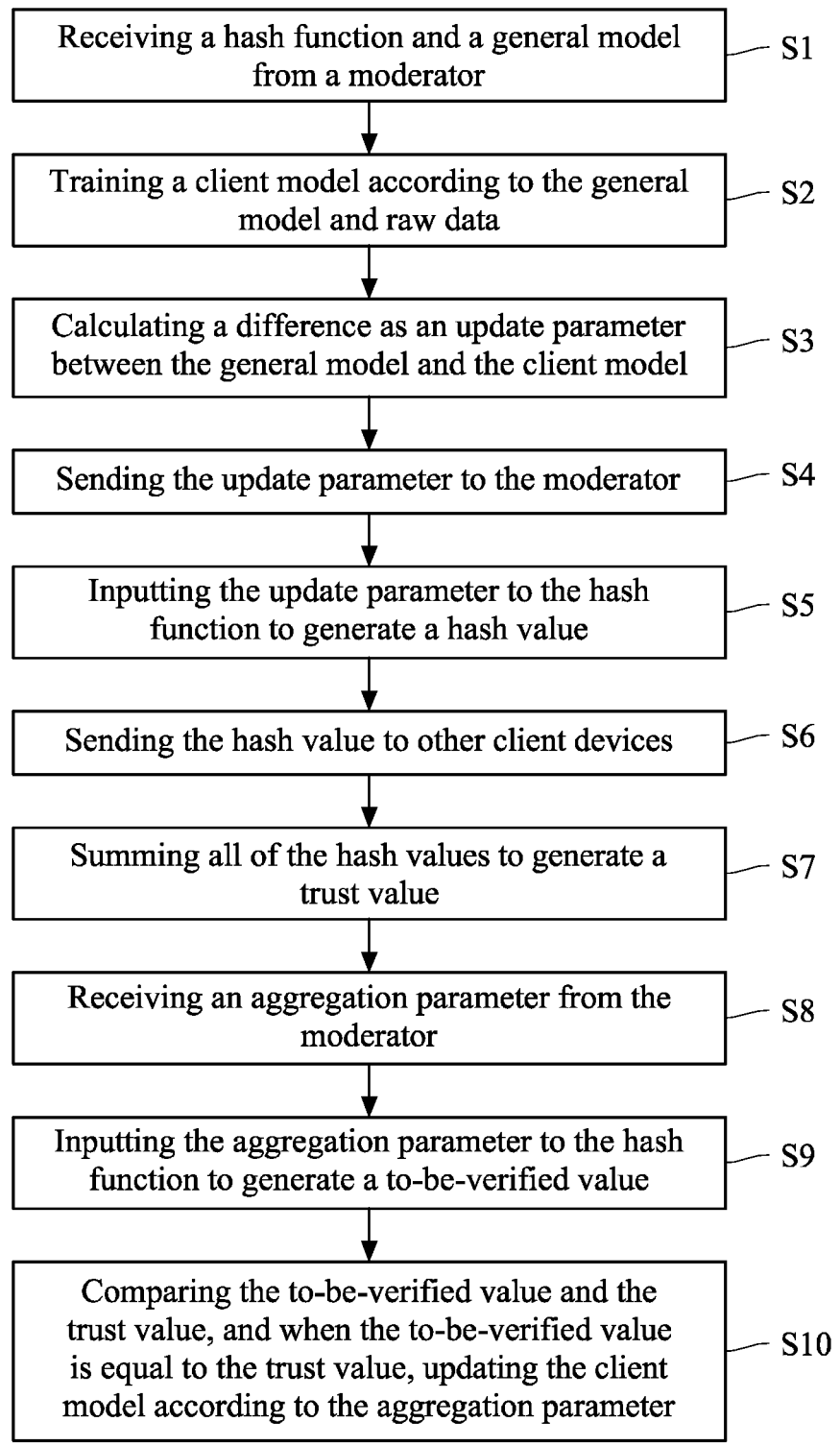

FIG. 1A is a schematic diagram of the architecture of a federation system to which the first embodiment of the present disclosure is applied. FIG. 1B is a flowchart of the method for verifying model update according to the first embodiment of the present disclosure. In the present disclosure, the first embodiment is also referred to as "Single Verifiable Moderator", or SVM for short. SVM is applicable to the FL system with a single moderator and multiple client devices, and the data sent from a client device to the moderator is non-private. In SVM, each client device performs the method shown in FIG. 1B respectively to verify the model update provided by the moderator. Since each client device performs the same steps, the client device mentioned below can be any client device in the FL system.

In step S1, the client device receives a hash function and a general model from a moderator. Regarding the general model, in the first training of FL system, the general model is initialized by the moderator and be broadcasted to all of the client devices. During the second and subsequent trainings of the FL system, the moderator updates the general model according to the feedback from the client devices and then broadcasts it to all of the client devices. Regarding the hash function, in an embodiment, the hash function is additively homomorphic function (AHH).

In step S2, the client device trains a client model according to the general model and raw data. In step S3, the client device calculates a difference as an update parameter between the general model and the client model. In step S4, the client device sends the update parameter to the moderator so that the moderator receives a plurality of update parameters sent from all of the client devices. Step S2 to Step S4 are normal operations in a FL system, and thus their details are not described here. As to the update parameter mentioned in step S3, it can be weights or gradients of the client model, where the present disclosure does not limit thereof.

In an embodiment of step S3, after the difference is calculated by the client device, a quantization procedure is performed to convert the difference from a floating-point type to an integer type. Specifically, for each training iteration, all of the client devices negotiate parameter for the quantization, including a zero-point and a scale, and thereby converting a floating number into an integer with specified bit length as the update parameter.

In step S4, each of the client device sends its update parameter to the moderator, and thus the moderator may receive the plurality of update parameters from the plurality of client devices.

In step S5, the client device inputs the update parameter to the hash function to generate the hash value. In an embodiment, let $H:X \rightarrow Y$ be some collision resistant hash function, i.e., it is computationally infeasible to find $x_1 \neq x_2$ such that $H(x_1)=H(x_2)$, where $x_1$ and $x_2$ are data. The hash function H is additively homomorphic if for any $x_1, \ldots, x_k$, we have $H(\Sigma_{i \in [k]} x_i) = \Sigma_{i \in [k]} H(x_i)$, where k is some parameter. In an embodiment, AHH can be instantiated from the lattice problem Ring-SIS mentioned in this document, "C. Peikert, "A Decade of Lattice Cryptography," *Found. Trends Theor. Comput. Sci.*, vol. 10, p. 283-424, 2016". Particularly, let R be the cyclotomic ring with dimension N, where N is a power of 2, i.e., $R=\mathbb{Z}[x]/(x^n+1)$, and $R_Q=R/QR$ for some modulus Q. Then we construct the AHH process by defining a function H which takes the input with domain $X=\{x \in \mathbb{Z}^{Nl} \subset R^l : \|x\|_\infty < \beta\}$ for some $\beta \in \mathbb{Z}$, and output with domain $Y=R_Q^k$. The hash H description is a ring matrix $A \in R_Q^{k \times l}$. On input $x \in X$, where x can be interpreted as a ring vector in $R^l$, $H(x)$ outputs $h = Ax \mod Q$, where the output h is so-called hash value. It should be noted that the above process is only an example, and the present disclosure does not limit the functions used to implement AHH.

In step S6, the client device sends the hash value to the plurality of client devices other than itself, and receives other hash values from other client devices. In other words, each client device in the FL system broadcasts its own hash value to other client devices. Thus each client device receives hash values generated by all of the client devices.

In step S7, the client device sums all of the hash values to generate a trust value. These hash values include the hash values generated by itself and said other hash values received from other client devices.

In step S8, the client device receives an aggregation parameter from the moderator. Specifically, for updating the general model, the moderator performs an aggregation according to all of the update parameters. Here, the updated general model is called an aggregation model, and the weights or gradients of this aggregation model are called aggregation parameters. Step S8 is the normal operation of the FL system.

In step S9, the client device inputs the aggregation parameter to the hash function to generate a to-be-verified value.

In step S10, the client device compares the to-be-verified value and the trust value. The aggregation parameter generated by the moderator is normal when the to-be-verified value is equal to the trust value, and thus the client device may update the client model according to the aggregation parameter.

Overall, SVM proposes a Verifiable Aggregation Protocol (VAP) in step S4 to step S10. By using AHH, the first embodiment of the present disclosure designs VAP against a malicious moderator. Consider the scenario that n honest client devices $C_1, \ldots, C_n$, each of them holds (non-private) inputs $x_1, \ldots, x_n$ (i.e., update parameters mentioned in step S3). The moderator M calculates the aggregation of all the inputs in a verifiable way. In step S4 and step S6, each client device $C_i$ broadcasts the data's hash value $h_i = H(x_i)$, and sends the update parameter $x_i$ to the moderator M. In step S8, the moderator M broadcasts the aggregation parameter z to all of the client devices $C_i$. In step S7, step S9 and step S10, each client device $C_i$ checks $\Sigma_{i \in [k]} h_i = H(z)$ to determine whether z is the correct aggregated result.

Please refer to Table 1. When the update parameters sent from the client device to the moderator do not need to be encrypted, the SVM of the first embodiment can be directly applied to the FL system with multiple moderators. Under normal conditions, the aggregation operations performed by the moderators are the same. Therefore, performing SVM for each of the multiple moderators can not only satisfy the FL system configuration of "multiple moderators, non-private aggregation", but also achieve the effect of verifying the aggregation result of each moderator.

Figure 2A:
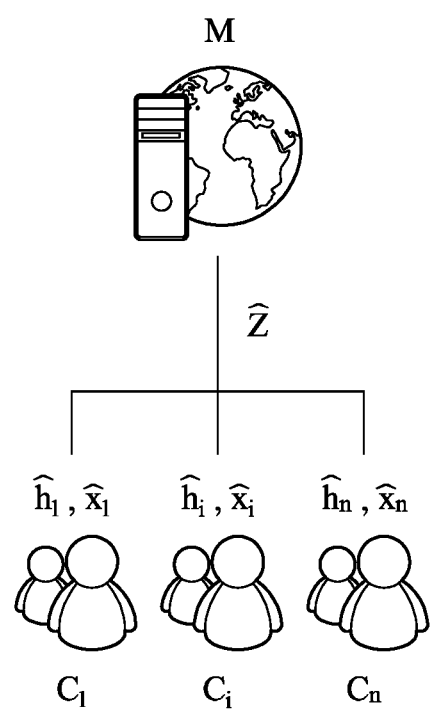
Figure 2B:
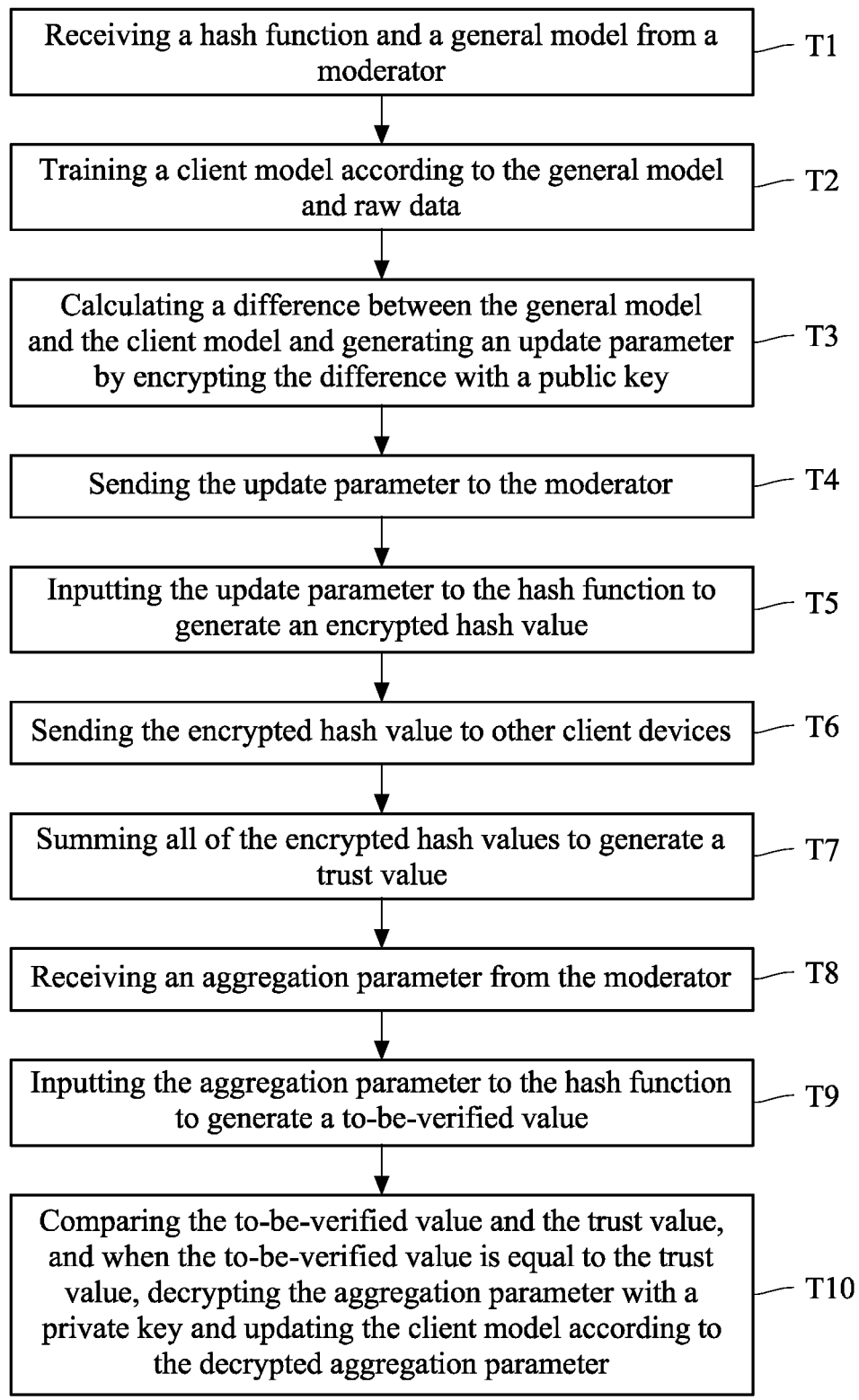

FIG. 2A is a schematic diagram of the architecture of a federation system to which the second embodiment of the present disclosure is applied. FIG. 2B is a flowchart of the method for verifying model update according to the second embodiment of the present disclosure. In the present disclosure, the first embodiment is also referred to as "Single Secure and Verifiable Moderator", or SSVM for short. Please refer to FIG. 1B and FIG. 2B, the steps T1 to T10 of the SSVM are mostly the same as the steps S1 to S10 of the SVM, and the differences between the two are described below.

During the execution of step T3, when the client device calculates the difference as the update parameter between the general model and the client model, the client device further encrypts the difference to generate the update parameter. In addition, during the execution of step T10, before the client device updates the client model according to the aggregation parameter, the client device decrypts the aggregation parameter according to a private key and then update the client model according to the decrypted aggregation parameter.

In an embodiment, each client device performs a KeyGen protocol of a threshold additive homomorphic encryption (TAHE). Please refer to "S. Gordon, F.-H. Liu and E. Shi, "Constant-Round MPC with Fairness and Guarantee of Output Delivery," in CRYPTO, 2015". The TAHE scheme consists KeyGen protocol, Enc (·), and Dec (·) algorithms. The KeyGen protocol generates a common public-key pk and shares of the corresponding private key sk to every party. Enc (x, pk) encrypts x to the ciphertext $\hat{x}$. Dec ($\hat{x}$, sk) decrypts $\hat{x}$ to obtain x, where the functionality works only when more than a certain percentage of private key sk holders participates.

Overall, the second embodiment extends the SVM scenario with private inputs $\{\hat{x}_i\}_{i \in [n]}$ held by the client devices. The private inputs $\{\hat{x}_i\}_{i \in [n]}$ are encrypted update parameters. The client devices $C_i$ want to perform a verifiable FL training via the moderator M, without revealing their private inputs. Therefore, at the beginning of training, i.e., during step T1 to step T3, each client device $C_i$ runs the KeyGen protocol of TAHE, and obtain a public key pk and individual private keys $sk_i$. Then, during step T4 to step T10, the client devices and the moderator run VAP. Specifically, in step T4, each client device $C_i$ sends input $\hat{x}_i \leftarrow$ Enc $(x_i, pk)$ to the moderator. In step T5, the client device $C_i$ calculates the hash value $\hat{h}$ with encrypted update parameter $\hat{x}_i$.

In step T8, the client device $C_i$ receives the aggregation parameter $\hat{z}$ from the moderator. The aggregation parameter $\hat{z}$ is also the encrypted result.

If the consistency check from step T6 to step T10 passes, namely, $H(\hat{z}) = \Sigma_{i \in [n]} \hat{h}_i$, the client device $C_i$ may run the decode protocol Dec ($\hat{z}$, $sk_i$) to obtain the decrypted aggregation parameter, and then update the client model. Otherwise, the client device $C_i$ aborts by catching the cheating behavior from the moderator M.

In SVM and SSVM, there is a premise that the single moderator will always complete its task. The present disclosure relaxes this premise by proposing a more robust protocol against possible moderator failure (either maliciously or by random faults). To achieve robustness, redundant computation is introduced into the FL system. In other words, the single moderator's task is distributed to a plurality of moderators to handle individually. As in the prior embodiments, the present disclosure assumes that the client devices are honest (e.g., no information security threats, no hardware failure, no network disconnection, etc.). Please refer to Table 1. The present disclosure collectively refers to the third to fifth embodiments as "Multiple Secure and Verifiable Moderators" (MSVM). The FL systems mentioned in the third to fifth embodiments all have a plurality of moderators, each moderator needs to perform the private aggregation. In practice, one of the third, fourth or fifth embodiments may be selected for execution according to the number of health moderators.

In the present disclosure, the third embodiment is also referred to as "MSVM-⅔". The applicable scenario of the third embodiment is as follows: assuming the number of all of the moderators $\{M_j\}_{j \in [m]}$ is m, and at least $$\frac{2}{3}m$$

honest moderators may complete the task, and the other $$\frac{1}{3}m$$

moderators may be either corrupted or dropped out at any moment. Please refer to the following documents, "M. Ben-Or, S. Goldwasser and A. Wigderson, "Completeness Theorems for Non-Cryptographic Fault-Tolerant Distributed Computation (Extended Abstract)," in *STOC*, 1988", and "A. Shamir, "How to Share a Secret," *Commun. ACM*, vol. 22, p. 612-613, 1979". MSVM-⅔ proposed in the present disclosure applies BGW protocol and Shamir's secret sharing that mentioned in the above documents.

An (n, t) secret sharing scheme consists of two algorithms, Share (·) and Recon (·), where Share (x) distributes the input x into n shares such that only when t of them are collected can Recon (·) recovers the input x. Otherwise, x is information-theoretically hidden. Shamir's secret sharing scheme achieves the goal based on polynomial evaluation and interpolation.

Figure 3A:
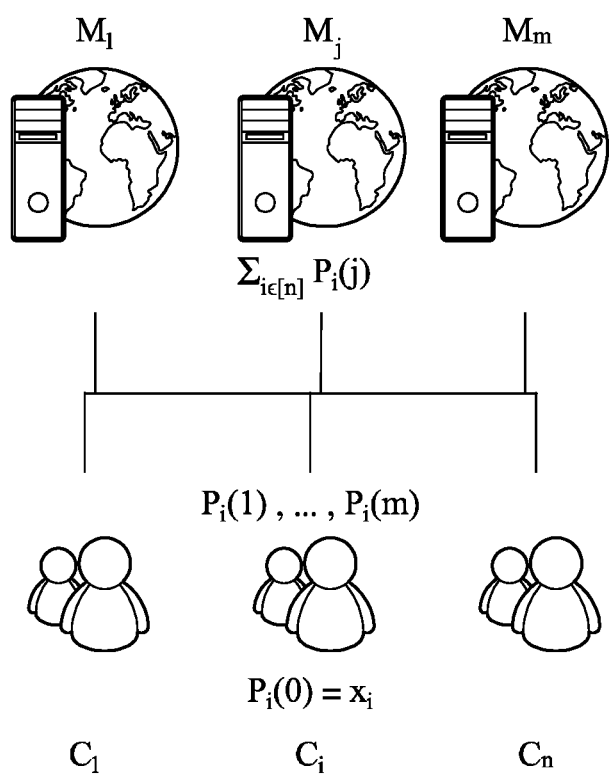
Figure 3B:
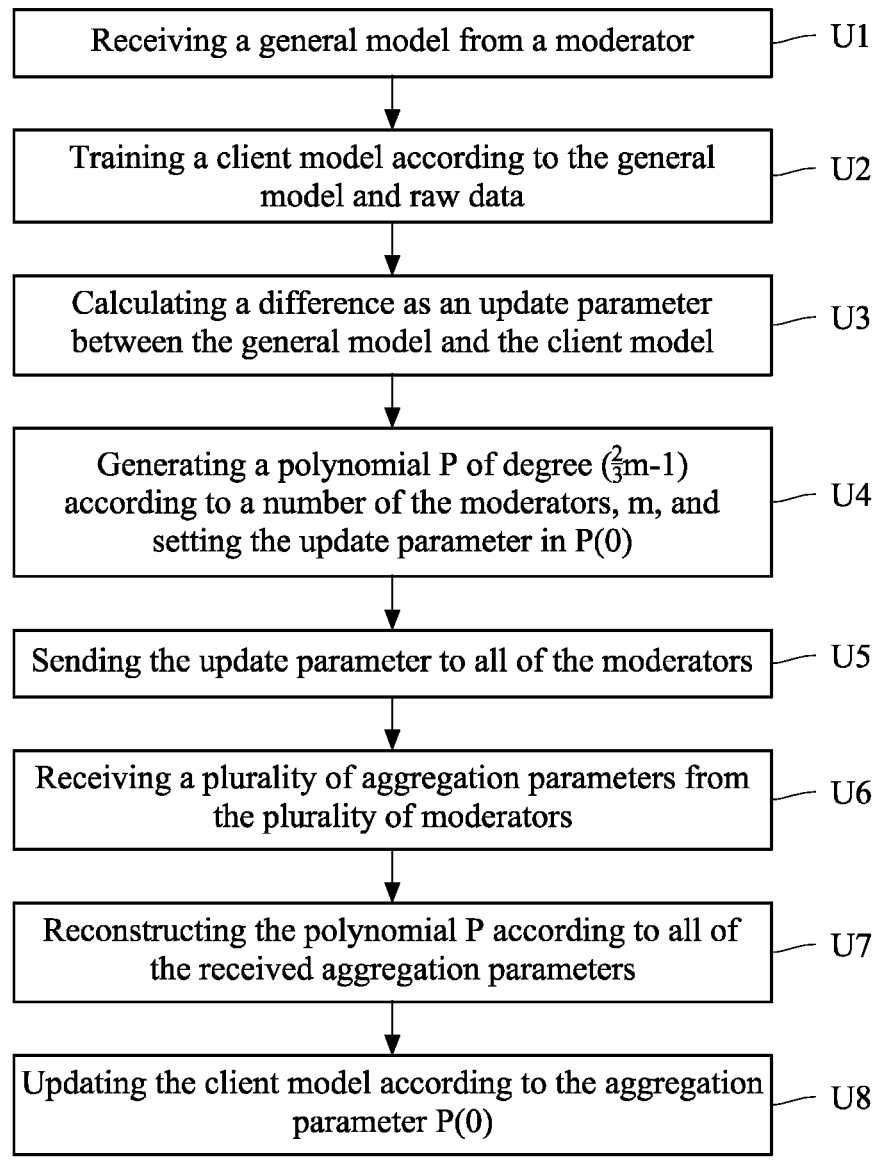

FIG. 3A is a schematic diagram of the architecture of a federation system to which the third embodiment of the present disclosure is applied. FIG. 3B is a flowchart of the method for verifying model update according to the third embodiment of the present disclosure. Step U1 to Step U3 are substantially the same as step S1 to step S3 in the first embodiment. The difference is that the third embodiment does not need to use a hash function, so in step U1, only the general model is received by the client device from the moderator.

In step U4, the client device $C_i$ generates a polynomial $P_i$ with degree $$\frac{2}{3}m-1$$

and the update parameter $x_i=P_i(0)$.

In step U5, the client device $C_i$ sends the polynomial $P_i(j)$ to the moderator $M_j$ by Share $(x_i)$.

In step U6, the client device $C_i$ receives the plurality of aggregation parameters $p_j=\Sigma_{i \in [n]} P_i(j)$ from all of the moderators $M_j$.

In step U7, the client device $C_i$ checks the aggregation parameters $(p_1, \ldots, p_m)$ received from all of the moderators $M_j$, and reconstruct the polynomial $P_i$ by Recon $(p_1, \ldots, p_m)$. By the homomorphic and robustness properties of the Shamir's scheme, as long as more than $$\frac{2}{3}m$$

of aggregation parameters $p_j$ are computed correctly, the unique polynomial $P_i$ can be reconstructed, and then the aggregation parameter $P(0)=z=\Sigma_{i \in [n]} x_i$ can be calculated. Otherwise, among m moderators $M_j$, the moderators $M_j$ of the number more than $$\frac{2}{3}m$$

are abnormal.

In step U8, the client device $C_i$ updates the client model according to the aggregation parameter z.

It should be noted that the third embodiment is information-theoretically secure and thus no cryptographic tool is needed.

Figure 4A:
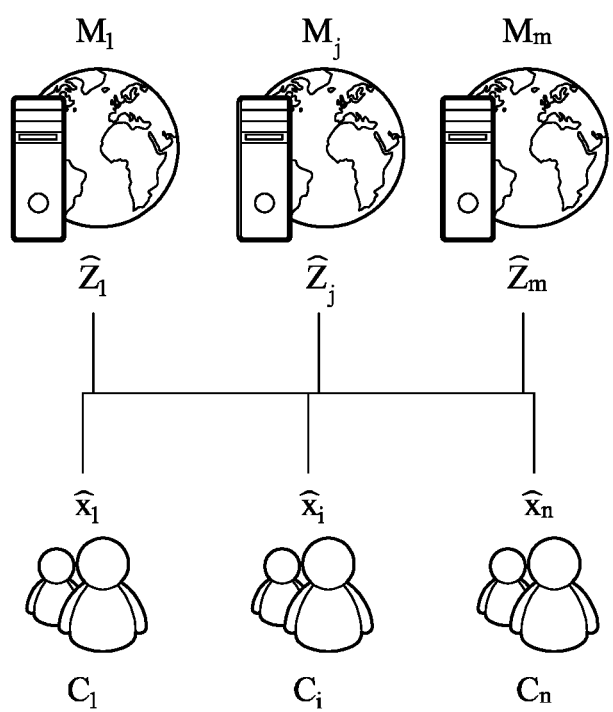
Figure 4B:
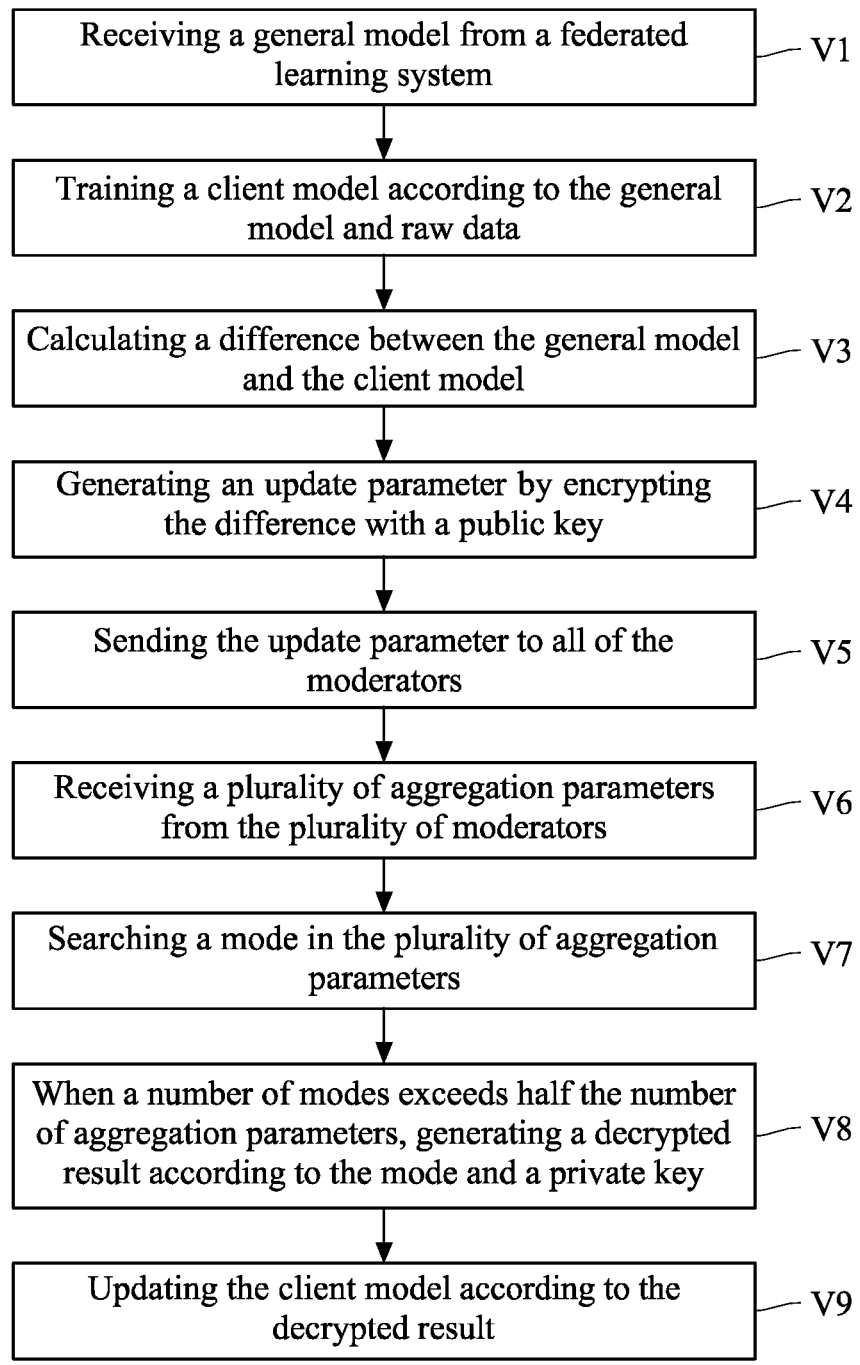

FIG. 4A is a schematic diagram of the architecture of a federation system to which the fourth embodiment of the present disclosure is applied. FIG. 4B is a flowchart of the method for verifying model update according to the fourth embodiment of the present disclosure. The fourth embodiment further relaxes the condition of the third embodiment, namely, supposing there are at least $$\frac{1}{2}m$$

honest moderators $M_j$ in the FL system. The fourth embodiment of the present disclosure is also referred to as "MSVM-half".

In step V1, the client device $C_i$ receives a general model from a FL system. For example, the general model is received from one of the plurality of moderators. On the premise that all moderators and all client devices in the FL system have the same general model, the present disclosure does not limit which device in the FL system is responsible for broadcasting the general model. In step V2, the client device $C_i$ trains a client model according to the general model and raw data. In step V3, the client device $C_i$ calculates a difference $x_i$ between the general model and the client model. Steps V1 to V3 are substantially the same as steps S1 to S3 in the first embodiment.

In step V4, the client device $C_i$ encrypts the difference $x_i$ with a public key pk to generate an update parameter $\hat{x}_i$=TAHE.Enc($x_i$, pk). In an embodiment, the client device $C_i$ runs the KeyGen protocol of TAHE to obtain the public key pk and the private key $sk_i$ before step V4.

In step V5, the client device $C_i$ sends the update parameter $\hat{x}_i$ to all of the moderators $M_j$, so that each moderator $M_j$ receives a plurality of update parameters $\hat{x}_i$.

In step V6, the client device $C_i$ receives a plurality of aggregation parameters $\hat{z}_j$ from the plurality of moderators $M_j$. Each aggregation parameter $\hat{z}_j$ is calculated by each moderator $M_j$ according to the aforementioned update parameters $\hat{x}_i$, namely, $\hat{z}_j = \Sigma_{i \in [n]} \hat{x}_i$.

In step V7, the client device $C_i$ searches a mode $\hat{z}$ in all of the aggregation parameters $(\hat{z}_1, \ldots, \hat{z}_m)$. The mode is the value that appears most often in a set of data values. In other words, the client device $C_i$ checks the majority consistency of $\hat{z}$.

In step V8, when a number of modes $\hat{z}$ exceeds half the number of aggregation parameters $(\hat{z}_1, \ldots, \hat{z}_m)$, namely, when more than a half of the aggregation parameters $(\hat{z}_1, \ldots, \hat{z}_m)$ have the same values, the client devices $C_i$ generates a decrypted result z according to the mode $\hat{z}$ and a private key $sk_i$.

In step V9, the client devices $C_i$ updates the client model according to the decrypted result z.

In the fourth embodiment (MSVM-half), the premise is that the FL system has an honest-majority moderators. Therefore, a majority vote is sufficient to guarantee the correct sum of the ciphertexts $\hat{z}_j = \Sigma_{i \in [n]} \hat{z}_i$, without using VAP in the first embodiment (SVM).

The fifth embodiment considers the worst case where there is only one honest moderator in the multi-moderator FL system.

Figure 5A:
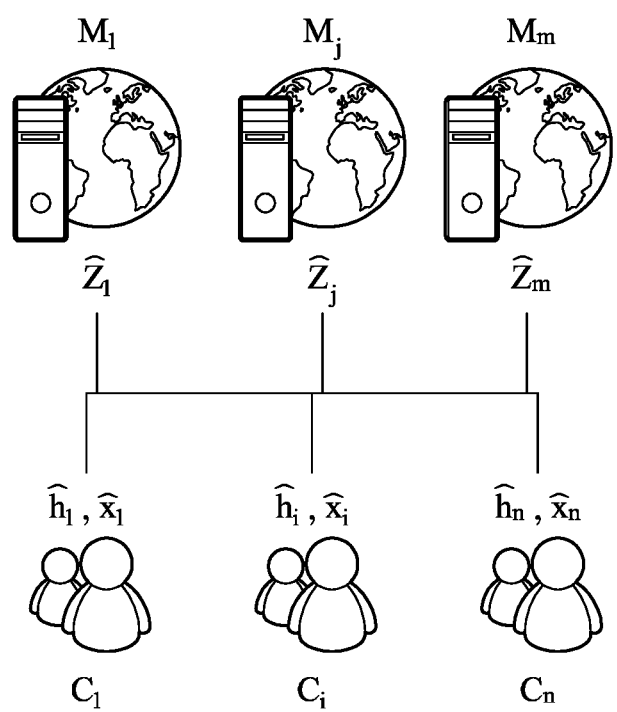
Figure 5B:
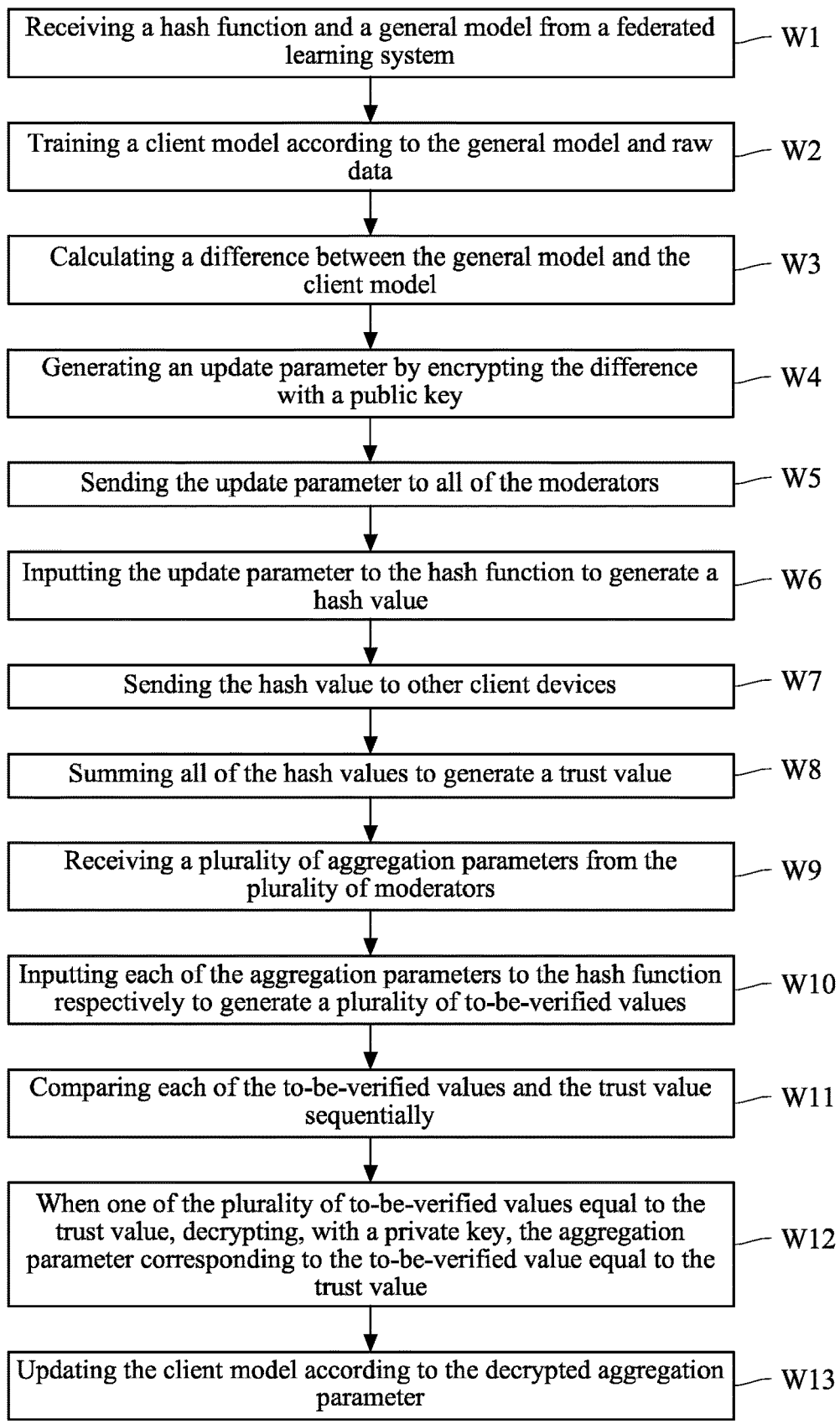

FIG. 5A is a schematic diagram of the architecture of a federation system to which the fifth embodiment of the present disclosure is applied. FIG. 5B is a flowchart of the method for verifying model update according to the fifth embodiment of the present disclosure. In the present disclosure, the fifth embodiment is also referred to as "MSVM-one".

In step W1, the client device $C_i$ receives a hash function and a general model from a federated learning system. For example, the general model is received from one of the plurality of moderators. In an embodiment, the hash function is AHH. In step W2, the client device $C_i$ trains a client model according to the general model and raw data. In step W3, the client device $C_i$ calculates a difference $x_i$ between the general model and the client model. Step W1 to Step W3 are substantially the same as step S1 to step S3 in the first embodiment.

In step W4, the client device $C_i$ generates an update parameter $\hat{x}_i$=TAHE.Enc($x_i$, pk) by encrypting the difference $x_i$ with a public key pk. In an embodiment, the client device $C_i$ runs the KeyGen protocol of TAHE to obtain the public key pk and the private key $sk_i$ before step W4.

In step W5, the client device $C_i$ sends the update parameter $\hat{x}_i$ to all of the moderators $M_j$, so that each moderator $M_j$ receives a plurality of update parameters $(\hat{x}_1, \ldots, \hat{x}_n)$.

In step W6, the client device $C_i$ inputs the update parameter $\hat{x}_i$ to the hash function H to generate a hash value $\hat{h}_i = H(\hat{x}_i)$.

In step W7, the client device $C_i$ sends the hash value $\hat{h}_i$ to other client devices, so that the client device $C_i$ receives a plurality of hash values other than the hash value generated by itself.

In step W8, the client device $C_i$ sums all of the hash values $\hat{h}_i$ to generate a trust value $\Sigma_{i \in [n]} \hat{h}_i$.

In step W9, the client device $C_i$ receives a plurality of aggregation parameters $(\hat{z}_1, \ldots, \hat{z}_m)$ from the plurality of moderators $M_j$. Each aggregation parameter $\hat{z}_j$ is calculated by each moderator $M_j$ according to the plurality of update parameters $(\hat{x}_1, \ldots, \hat{x}_n)$, namely, $\hat{z}_j = \Sigma_{i \in [n]} \hat{x}_i$.

In step W10, the client device $C_i$ inputs each of the aggregation parameters $\hat{z}_j$ to the hash function H respectively to generate a plurality of to-be-verified values $H(\hat{z}_j)$.

In step W11, the client device $C_i$ compares each of the to-be-verified values $H(\hat{z}_j)$ and the trust value $\Sigma_{i \in [n]} \hat{h}_i$ sequentially. In other words, for j=1, ..., m, the client device $C_i$ checks whether $H(\hat{z}_j) = \Sigma_{i \in [n]} \hat{h}_i$ is true. Overall, step W10 and step W11 are a hash consistency check performed by the client device $C_i$.

In step W12, when the first to-be-verified value $H(\hat{z}_j)$ equal to the trust value $\Sigma_{i \in [n]} \hat{h}_i$ is found, all of the client device $C_i$ decrypts the aggregation parameter $\hat{z}$ corresponding to this to-be-verified value according to their private key $sk_i$, namely, z=TAHE.Dec($\hat{z}$, $sk_i$). In other words, $\hat{z}$ is the first ciphertext passing the hash consistency check.

In step W13, the client device $C_i$ updates the client model according to the decrypted aggregation parameter z.

The present disclosure adopts several cryptographic tools to build secure and trustworthy moderators. In the first embodiment, the additive homomorphic hash (AHH) is used in the FL system with a single moderator for building a verifiable aggregation protocol (VAP), such that client devices can verify the correctness of aggregation parameter computation. The (robust threshold) secret sharing is used in the FL system with multiple moderators. In the condition where the moderators are less honest, the threshold additive homomorphic encryption (TAHE) is used to protect the privacy of update parameters of client devices.

The following describes the method for verifying the model update proposed by the present disclosure from two aspects, performance (test accuracy) and training time, of the general model.

Figure 6:
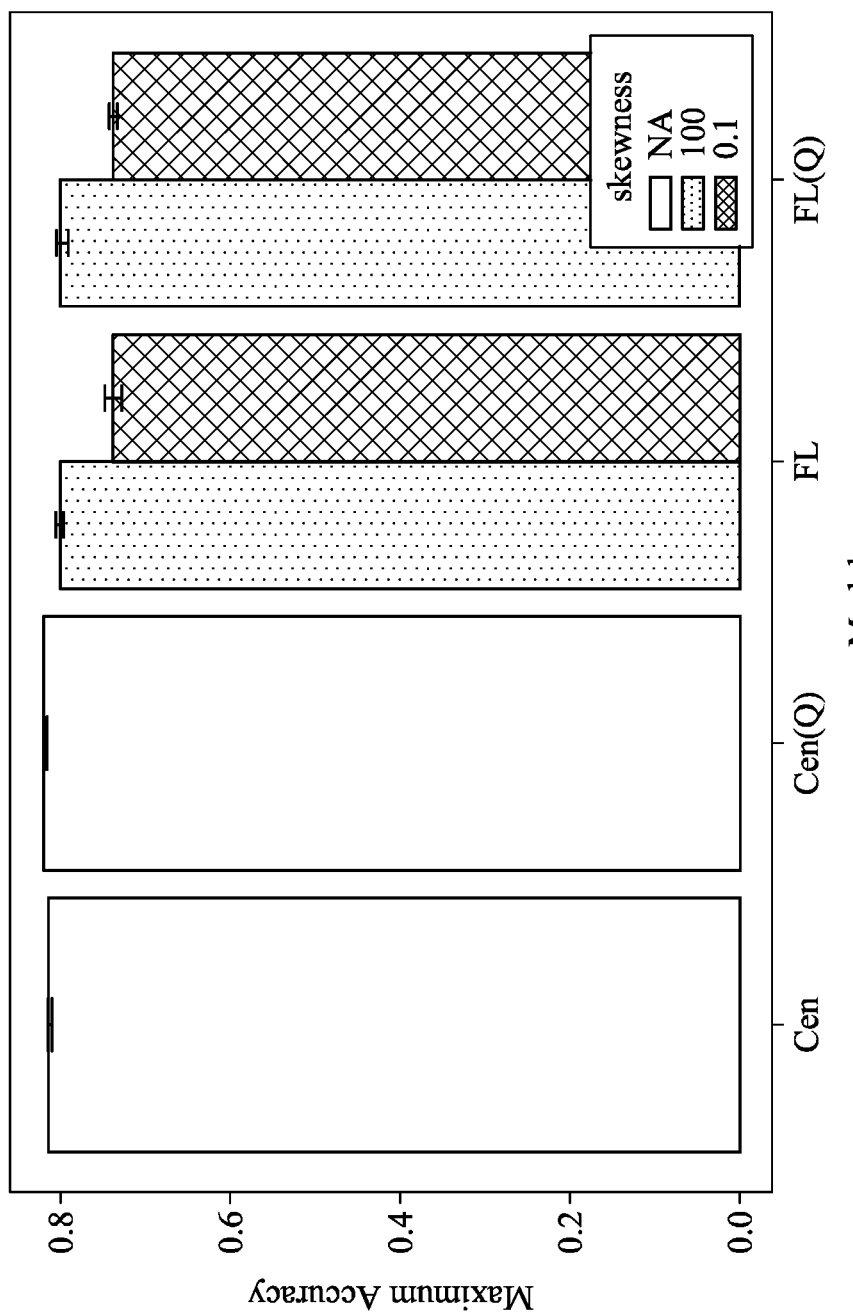
FIG. 6 is a comparison diagram of the average maximum test accuracy of the general model.

FIG. 6 is a comparison diagram of the average maximum test accuracy of the general model. The four bars from left to right correspond to different methods for training the general model: regular centralized training (Cen), quantized centralized training (Cen (Q)), regular federated training (FL), and quantized federated training (FL (Q)). The interval on each bar indicates the standard deviation of the five experiments. Overall, the maximum accuracy is stable among experiments.

It can be observed from FIG. 6 that: (1) the quantization of update parameters does not largely impact the accuracy; (2) the accuracy of the FL algorithms is slightly lower than the centralized algorithms; and (3) the level of data skewness does impact the accuracy and the parameter value and the accuracy have a positive correlation. Specifically, the testing accuracy of SVM, SSVM, MSVM-half, and MSVM-one are 0.742 (0.009), 0.741 (0.009), 0.736 (0.002), and 0.734 (0.002), respectively. The values in the parentheses are the standard deviation of the five experiments.

Table 2 shows an average computational time and overhead (per iteration in seconds) of training the network of 1,250,858 update parameters.

| Exp. | Train | Aggregate | Quant. | Dequant. | AHH | Con. Check | Encrypt | Decrypt | Overhead |
|---|---|---|---|---|---|---|---|---|---|
| Cen | 12.584 | — | — | — | — | — | — | — | 0% |
| Cen(Q) | 12.530 | — | 0.004 | 0.002 | — | — | — | — | -0.3% |
| FL | 12.245 | 0.004 | — | — | — | — | — | — | -2.7% |
| FL(Q) | 12.215 | 0.002 | 0.003 | 0.004 | — | — | — | — | -2.9% |
| SVM | 11.995 | 0.001 | 0.003 | 0.004 | 2.166 | 2.165 | — | — | 29.8% |
| SSVM | 13.141 | 0.027 | 0.002 | 0.005 | 4.360 | 4.362 | 4.216 | 2.094 | 124.2% |
| MSVM-half | 13.128 | 0.078 | 0.002 | 0.005 | — | 0.057 | 4.217 | 2.105 | 55.7% |
| MSVM-one | 13.036 | 0.077 | 0.002 | 0.017 | 4.356 | 8.465 | 4.211 | 2.105 | 156.4% |

Table 2 reports the time overhead of multiple embodiments of the present disclosure and the centralized training in each procedure. The dash denotes that the method does not have the procedure. The iteration time includes the time for performing the forward and backward processes to update the general model. The consistency (Con.) check time includes the time for hash consistency check, majority consistency check, and the equality check for the aggregation. Quantization and dequantization of update parameters only take a few milliseconds without large accuracy degradation, which can be considered in the security protocol design. The verifiable computing process, such as AHH and Con. Check, increases about four seconds for an iteration, which increases about 30% per iteration training time compared to the centralized training. If the update parameters are encrypted, the verifiable process takes additional time according to the increased size of the ciphertext compared to the plaintext. Overall, enabling the homomorphic addition to encrypted update parameters largely increases the training time. The time can be reduced by the hardware support and the better implementation. The aggregation time increases in the multiple moderator scenarios but the increment is relatively smaller than the time for the update parameter encryption. The hash consistency check greatly increases in the MSVM-one experiments, which takes about 8.5 seconds to perform two checks, because the honest moderator is randomly determined during training. The average time for checking one aggregation parameter $\hat{z}$ and the corresponding hash takes about 4.3 seconds. The hash consistency check of the MSVM-half experiment is small because checking the majority consistency of $\hat{z}$ is rapid. Overall, encrypting update parameters greatly increases the training time.

The method for verifying model update proposed in the present disclosure includes multiple embodiments that are suitable for various scenarios with different security guarantees. Particularly, two important design demands are considered: (1) whether the update parameters of client devices need to be kept private and (2) whether more moderators are available during the FL. Specifically, proposes protocols to address the following three scenarios:

(1) A Single Verifiable Moderator (SVM): When the update parameters of client devices are non-private, the goal in SVM is to check the correctness of the aggregated result for a moderator. This method can be extended to the FL system with multiple moderators, as client devices simply run the single moderator protocol with each of the moderators. As long as one of the moderators does not drop out during FL training, the client devices can receive the expected aggregation parameters;

(2) A Single Secure and Verifiable Moderator (SSVM): This scenario is similar to SVM, except the update parameters of client devices are private and should be protected, for achieving a verifiable and private aggregation; and (3) Multiple Secure and Verifiable Moderators (MSVM): MSVM focuses on the robust moderators, where the aggregation operation cannot be disrupted by failures from the moderator. To achieve this goal, the present disclosure decentralizes the single moderator into multiple moderators so that they can run some distributed protocol to prevent the disruption caused by moderator failure.

In view of the above, in several FL settings with progressive secure levels, the present disclosure evaluates their concrete performance/overhead, and the result demonstrates the practicality of the present disclosure, which enhances the protection from the client's perspective and makes an important step toward developing a robust and trustworthy FL for current and future applications.

What is claimed is:

1. A method for verifying model update applicable to a federated learning system having a moderator and a plurality of client devices, wherein the method comprises a plurality of steps performed by each of the plurality of client devices and the plurality of steps comprises:
   receiving a hash function and a general model from the moderator;
   training a client model according to the general model and raw data;
   calculating a difference between the general model and the trained client model as an update parameter;
   sending the update parameter to the moderator;
   inputting the update parameter to the hash function to generate a hash value;
   sending the hash value to the plurality of client devices other than the client device performing the method and receiving a plurality of other hash values;
   summing the hash value and the plurality of other hash values to generate a trust value;
   receiving an aggregation parameter from the moderator, wherein the aggregation parameter is calculated by the moderator according to the update parameter from each of the plurality of client devices;
   inputting the aggregation parameter to the hash function to generate a to-be-verified value;
   comparing the to-be-verified value and the trust value, and updating the trained client model according to the aggregation parameter when the to-be-verified value equals the trust value.

2. The method for verifying model update of claim 1, wherein the hash function is additively homomorphic hash function.

3. The method for verifying model update of claim 1, wherein calculating the difference between the general model and the trained client model as the update parameter by each of the plurality of client devices comprises:
   calculating the difference between the general model and the trained client model; and performing a quantization procedure to convert the difference from a floating-point type to an integer type.

4. The method for verifying model update of claim 1, wherein:
calculating the difference between the general model and the trained client model as the update parameter by each of the plurality of client devices comprises: encrypting the difference according to a public key to generate the update parameter by each of the plurality of client devices; and
updating the trained client model according to the aggregation parameter comprises: decrypting the aggregation parameter according to a private key and updating the trained client model according to the decrypted aggregation parameter by each of the plurality of client devices.

5. The method for verifying model update of claim 4, further comprising: performing a KeyGen protocol of a threshold additive homomorphic encryption to generate the public key and the private key by each of the plurality of client devices.

6. A method for verifying model update applicable to a federated learning system having a plurality of moderators and a plurality of client devices, wherein the method comprises a plurality of steps performed by each of the plurality of client devices and the plurality of steps comprises:
receiving a general model from the federated learning system;
training a client model according to the general model and raw data;
calculating a difference between the general model and the trained client model;
generating an update parameter by encrypting the difference with a public key;
sending the update parameter to the plurality of moderators;
receiving a plurality of aggregation parameters from the plurality of moderators, wherein each of the plurality of aggregation parameters is calculated by each of the plurality of moderators according to the update parameter;
searching a mode in the plurality of aggregation parameters;
generating a decrypted result according to the mode and a private key when a number of modes exceeds half of a number of aggregation parameters; and
updating the trained client model according to the decrypted result.

7. The method for verifying model update of claim 6, wherein each of the plurality of client devices performs a KeyGen protocol of a threshold additive homomorphic encryption to generate the public key and the private key.

8. A method for verifying model update applicable to a federated learning system having a plurality of moderators and a plurality of client devices, wherein the method comprises a plurality of steps performed by each of the plurality of client devices and the plurality of steps comprises:
receiving a hash function and a general model from one of the plurality of moderators;
training a client model according to the general model and raw data;
calculating a difference between the general model and the trained client model;
generating an update parameter by encrypting the difference with a public key;
sending the update parameter to the plurality of moderators;
inputting the update parameter to the hash function to generate a hash value;
sending the hash value to the plurality of client devices other than the client device performing the method and, receiving a plurality of other hash values;
summing the hash value and the plurality of other hash values to generate a trust value;
receiving a plurality of aggregation parameters from the plurality of moderators, wherein each of the plurality of aggregation parameters is calculated by each of the plurality of moderators according to the update parameter;
inputting each of the plurality of aggregation parameters to the hash function to generate a plurality of to-be-verified values;
comparing each of the plurality of to-be-verified values and the trust value sequentially; and
when one of the plurality of to-be-verified values equal to the trust value is found, decrypting one of the plurality of aggregation parameters corresponding to the one of the plurality of to-be-verified values equal to the trust value according to a private key and updating the trained client model according to the decrypted one of the plurality of aggregation parameters.

9. The method for verifying model update of claim 8, wherein the hash function is additively homomorphic hash function.

10. The method for verifying model update of claim 8, wherein each of the plurality of client devices performs a KeyGen protocol of a threshold additive homomorphic encryption to generate the public key and the private key.

* * * * *